US010782313B2

(12) United States Patent
Zheng et al.

(10) Patent No.: US 10,782,313 B2
(45) Date of Patent: Sep. 22, 2020

(54) METHOD OF FABRICATING NANO-SCALE STRUCTURES ON THE EDGE AND NANO-SCALE STRUCTURES FABRICATED ON THE EDGE USING THE METHOD

(71) Applicants: Shuo Zheng, Milton (CA); Babak Baradaran Shokouhi, Toronto (CA); Mengmeng Deng, Sixian (CN); Bo Cui, Waterloo (CA)

(72) Inventors: Shuo Zheng, Milton (CA); Babak Baradaran Shokouhi, Toronto (CA); Mengmeng Deng, Sixian (CN); Bo Cui, Waterloo (CA)

(73) Assignee: Hangzhou Tanzhen Nanotech. Co., Ltd., Hangzhou (CN)

( * ) Notice: Subject to any disclaimer, the term of this patent is extended or adjusted under 35 U.S.C. 154(b) by 138 days.

(21) Appl. No.: 15/885,233

(22) Filed: Jan. 31, 2018

(65) Prior Publication Data
US 2018/0217182 A1 Aug. 2, 2018

Related U.S. Application Data

(60) Provisional application No. 62/452,360, filed on Jan. 31, 2017.

(51) Int. Cl.
*G01Q 60/38* (2010.01)
*G01Q 70/10* (2010.01)
*G01Q 70/06* (2010.01)

(52) U.S. Cl.
CPC ............. *G01Q 60/38* (2013.01); *G01Q 70/10* (2013.01); *G01Q 70/06* (2013.01)

(58) Field of Classification Search
CPC ......... B82Y 40/00; B82Y 30/00; B82Y 10/00; B82Y 15/00; G01Q 60/38; G01Q 70/10; G01Q 70/12; G01Q 60/16; G01Q 70/06; G01Q 70/14; H01L 21/3065; H01L 21/31144; H01L 21/32134; H01L 21/32139; H01L 21/823431; H01L 27/0886; H01L 29/0649; H01L 29/0657; H01L 29/20; H01L 29/22
USPC .......................... 250/306, 307; 204/452, 601; 257/E21.409, E29.255, 347, 417, 618; 850/40, 60
See application file for complete search history.

(56) References Cited

U.S. PATENT DOCUMENTS

| 4,968,585 A | 11/1990 | Albrecht et al. |
| 5,242,541 A | 9/1993 | Bayer et al. |
| 5,611,942 A | 3/1997 | Mitsui |

(Continued)

*Primary Examiner* — David A Vanore
(74) *Attorney, Agent, or Firm* — Ridout & Maybee LLP

(57) ABSTRACT

A fabrication method for the fabrication of special nano-scale structures, such as AFM probe tip(s) at the edge of a silicon and/or silicon nitride platform, called the cantilever. An array of these special AFM probes with the AFM tip structure located at the edge is fabricated from an array of regular AFM probes where the AFM tip structure may not originally have been located at the edge of the cantilever. A hard mask is formed on the probe's tip from a hard material, such as a metal mask, where more than one side of the tip could be uncovered. The non-covered side(s) of the probe tip structure(s) are subsequently etched to remove substrate materials, so that a sharp shaft (tip) is formed on the edge of the cantilever, when the process is done in a batch manner it results in an array of such AFM probe tips.

13 Claims, 3 Drawing Sheets

(56) References Cited

U.S. PATENT DOCUMENTS

| | | | |
|---|---|---|---|
| 6,091,124 A * | 7/2000 | Bayer | G01Q 60/16 |
| | | | 250/306 |
| 6,743,211 B1 | 6/2004 | Prausnitz | |
| 6,939,397 B2 | 8/2005 | Takazawa et al. | |
| 7,022,541 B1 | 4/2006 | Yenilmez et al. | |
| 7,370,515 B2 | 5/2008 | Okulan et al. | |
| 7,388,199 B2 | 6/2008 | Morimoto et al. | |
| 7,534,686 B2 | 5/2009 | Lee | |
| 7,793,147 B2 | 4/2010 | Park et al. | |
| 7,843,000 B2 | 11/2010 | Yu | |
| 7,847,207 B1 | 12/2010 | Chow et al. | |
| 8,354,320 B1 | 1/2013 | Xie | |
| 9,330,919 B1 | 5/2016 | Chen | |
| 9,522,821 B2 * | 12/2016 | Cui | B81C 1/00111 |
| 2004/0036403 A1 | 2/2004 | Ono et al. | |
| 2008/0061383 A1 | 3/2008 | Kawakita | |
| 2008/0098805 A1 | 5/2008 | Jin et al. | |
| 2009/0205092 A1 * | 8/2009 | Wang | G01Q 60/38 |
| | | | 850/40 |
| 2010/0055413 A1 * | 3/2010 | Badyal | B82Y 10/00 |
| | | | 428/195.1 |
| 2013/0049150 A1 | 2/2013 | Hong | |
| 2013/0056826 A1 * | 3/2013 | Liu | H01L 21/823431 |
| | | | 257/347 |
| 2013/0221448 A1 | 8/2013 | Chang | |
| 2013/0244392 A1 | 9/2013 | Oh | |
| 2013/0298977 A1 | 11/2013 | Chen | |
| 2014/0099539 A1 | 4/2014 | Yamazaki | |
| 2014/0117307 A1 | 5/2014 | Herner | |
| 2014/0138620 A1 | 5/2014 | Svensson | |
| 2014/0231254 A1 * | 8/2014 | Tung | G01N 27/44791 |
| | | | 204/452 |
| 2014/0236015 A1 | 8/2014 | Lee | |
| 2014/0312471 A1 | 10/2014 | Hong | |
| 2015/0011093 A1 | 1/2015 | Singh | |
| 2015/0069474 A1 | 3/2015 | Ching | |
| 2016/0041095 A1 | 2/2016 | Rothberg | |
| 2016/0068384 A1 * | 3/2016 | Cui | B81C 1/00111 |
| | | | 257/618 |
| 2016/0218012 A1 | 7/2016 | Shimamoto | |
| 2016/0225764 A1 | 8/2016 | Chang | |
| 2018/0217182 A1 * | 8/2018 | Zheng | G01Q 70/10 |

* cited by examiner

METHOD OF FABRICATING NANO-SCALE STRUCTURES ON THE EDGE AND NANO-SCALE STRUCTURES FABRICATED ON THE EDGE USING THE METHOD

CROSS-REFERENCE

This application claims the benefit of priority to U.S. Provisional Patent Application No. 62/452,360 filed Jan. 31, 2017, the contents of which are herein incorporated by reference.

FIELD OF INVENTION

The invention relates generally to the field of fabrication of nano-scale structures. In particular, the invention relates to fabrication of an AFM tip structure at the edge of a cantilever in a batch manner from scratch or from pre-existing regular AFM probes where the tip is not initially located at the end or the edge of the cantilever. In particular, this manufacturing process uses hard mask deposition, and etching processes to fabricate sharp AFM probe tips at the edge of a cantilever in a batch manner.

BACKGROUND OF THE INVENTION

Devices and structures at nano-scale are becoming increasingly useful. However, manufacturing such structures efficiently remains challenging.

For example, it is known to fabricate specialty Atomic Force Microscope ("AFM") tips (also popularly known as "High Aspect Ratio (HAR) AFM probes") using Focused Ion Beam ("FIB") to "machine" the tips one by one. This method is versatile and is not limited to producing AFM probes. However, because each probe is fabricated individually by this method, it is a slow and costly process.

AFM technology is becoming increasingly mature and more and more routinely used in advanced research and industrial research and development laboratories.

To achieve the required atomic or molecular scale resolution, an AFM probe itself must also have a thickness of comparable scale. AFM probe is only one example to illustrate the need for providing manufactured articles that are of nano-scale. Here, nano-scale articles generally refer to articles of which at least one of the structural dimensions such as width, radius, thickness and the like, is more appropriately measured in nanometers, i.e., generally at the atomic and molecular scale and commonly in the general range of one nanometer to no more than a few hundred nanometers. The number of miniaturized products is increasing, resulting in an increased demand for nano-scale structures to be manufactured in a more efficient and reproducible manner.

The foregoing creates challenges and constraints for providing a more efficient method of fabricating nano-scale structures and devices and in particular, providing sharp structures at the edge of the cantilever manufactured using such efficient and reproducible methods. The benefit of having such structure at the edge of the cantilever is to allow the operator to directly scan the area that is of interest rather than the unwanted areas. It is an object of the present invention to mitigate or obviate at least one of the above mentioned disadvantages.

SUMMARY OF THE INVENTION

The present invention is directed to fabrication of nano-scale structures. A broad aspect of the present invention involves a batch process for fabricating nano-scale structures, in particular, an array of AFM probe tips formed at the edge of silicon substrate(s) (cantilever(s)) from scratch or from pre-existing AFM probes.

To manufacture at least one or plurality of AFM tip structures simultaneously or in a batch process, the method starts from a silicon (Si) substrate that has formed thereon at least one or plurality of AFM tip structures in variety of shapes as described in the previous section. The array of the AFM tip structures may be from existing AFM probes or could be fabricated from the scratch. At least one sidewall (but could be more depending on the shape of the AFM tip structure) of the AFM tip structure is first covered with a hard material or hard materials to form a protective layer (i.e., a mask of the hard material). The AFM tip structure is next etched, with the hard material covering one side of the structure as a mask it protects the underlying substrate material from etching, the unprotected areas with the mask will be exposed to the etching gas and will be removed, thus forming a shaft. The shaft having a cross-sectional profile defined by the shape of the hard material mask on one or plurality of sides. Once the final shape of the AFM tip structure is formed at the edge of the cantilever, the hard material mask may be removed at the final step by the means of wet etching.

The method includes the steps of covering at least one side of the plurality of sides for the AFM tip structure with a protective layer of mask material for at least one AFM probe but not limited to one, with the deposition process which is done at an angle to create a shadowing effect and leaving at least one side of the AFM tip structure exposed, next the exposed sides of the AFM tip structure are etched anisotropically with an etchant gas in a batch process to form an AFM tip structure at the edge of a cantilever or plurality of AFM tip structures at the edge of plurality of AFM tip structures if the process was done on plurality of AFM probes. Each AFM tip structure being etched from the exposed facets have a shaft extending from the tip apex towards the bottom of the substrate or the cantilever, the shaft having along its length a transverse cross-sectional shape substantially defined by the shape of the mask. The shaft to form tapered walls extending from the tip of the apex of the tip structure towards the bottom of the substrate or the cantilever.

In a feature of this aspect of the invention, a plasma process, such as an ICP-RIE process, is employed for the etching of the exposed facets of the AFM tip structures. The substrate material may be silicon. An example mask material may be chromium, which can be evaporation coated and then removed from the sidewalls by physical sputtering with Ar ions. Alternatively, the mask material may be Al, and the Cl2 or BCl3 can be used in the ICP-RIE process to remove the coated Al from the sidewalls. In general, the mask material may be a suitable metal, such as Cr, Ti, Ni, and Al, or non-metal, such as SiO2.

The method of fabrication can be applied to an array of AFM probes, where each AFM probe within the array has a separate cantilever with an AFM tip structure placed on the cantilever as it is in the single AFM probe. The angled deposition method is used to cover at least one side of the plurality of the AFM tip structures in the array with a hard material mask. Further, the exposed sidewalls of the AFM tip structures within the array are etched away by the RIE process creating a shaft at the edge of the individual cantilevers within the array. The shaft extends from the apex of the tip structure to the bottom of the substrate or the. The shaft forms tapered walls extending from the tip of the apex of the tip structure towards the bottom of the substrate or the cantilever.

In other aspects the invention provides various combinations and subsets of the aspects described above.

BRIEF DESCRIPTION OF THE DRAWINGS

For the purposes of description, but not of limitation, the foregoing and other aspects of the invention are explained in greater detail with reference to the accompanying drawings, in which.

DESCRIPTION OF THE EMBODIMENTS

Figure 1:
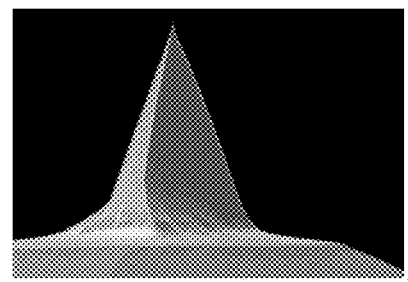
FIG. 1 Shows the side view Scanning Electron Microscope "SEM" image of a silicon based AFM probe tip.

The description which follows and the embodiments described therein are provided by way of illustration of an example, or examples, of particular embodiments of the principles of the present invention. These examples are provided for the purposes of explanation and not limitation of those principles and of the invention. In the description which follows, like parts are marked throughout the specification and the drawings with the same respective reference numerals.

The terms: AFM tip, AFM probe are used interchangeably and shall bear the same meaning unless expressed otherwise.

In this context AFM tip or AFM probe means the entire AFM tip constitution, including the tip, cantilever and the extended areas.

The terms: The tip, AFM tip structure, AFM probe tip, shaft, probe's shaft, tip's shaft are used interchangeably and shall bear the same meaning unless expressed otherwise.

Figure 2:
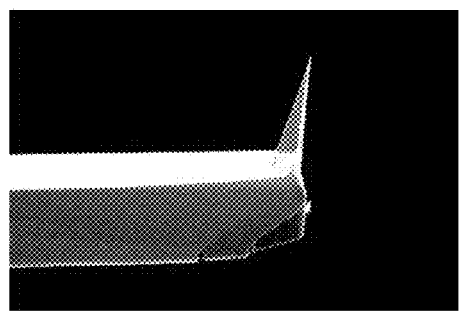
FIG. 2 Shows a side view of the scanning electron microscope "SEM" photographs of AFM probe tip at the edge, fabricated from AFM probe tip shown in FIG. 1.
Figure 3:
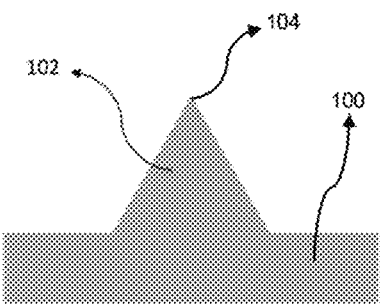
FIG. 3 is a diagram that illustrates a side view of a pyramid-shaped AFM probe tip shown in the photographs of FIG. 1.

In this context the tip or its alternative names listed above, is a sharp structure [FIG. 1] with the following attributes:

The tip can have variety of shapes and structures with a sharp apex, located anywhere on the cantilever [FIG. 1] or at the edge of the cantilever [FIG. 2].

The tip may have a polyhedron, pyramid, or circular base or any other shape or structure with a sharp apex.

The tip may have a single or plurality of facets.

A fabrication method for the fabrication of special nanoscale structures, such as AFM probe tip(s) at the edge of a silicon and/or silicon nitride platform, called the cantilever. An array of these special AFM probes with the AFM tip structure located at the edge is fabricated from an array of regular AFM probes where the AFM tip structure may not originally have been located at the edge of the cantilever. A hard mask is formed on the probe's tip from a hard material, such as a metal mask, where more than one side of the tip could be uncovered. The non-covered side(s) of the probe tip structure(s) are subsequently etched to remove substrate materials, so that a sharp shaft (tip) is formed on the edge of the cantilever, when the process is done in a batch manner it results in an array of such AFM probe tips at the edge of such cantilevers. The resultant structure is very useful to directly locate the probe tip at the intended area for scanning and viewing.

The present invention relates to the method of fabricating AFM probe tip at the edge [103] of a cantilever [100] from scratch or from a pre-existing AFM probe [FIG. 1]. The method can be extended to fabricate plurality of AFM probe tips at the edge of plurality of cantilevers of pre-existing AFM or made from scratch probes in a batch manner. The process starts by employing a single or multiple AFM probe tips [102] with Si cantilever [100] shown in FIG. 1. A sidewall [106] or more than one facet of the AFM probe tip or probe tips is/are first covered with a hard material [108] or hard materials. Here, by the word "hard", it is meant that the material is resistive to etching with sufficiently high selectivity (e.g., at least 1:10) against the substrate material, here silicon, i.e., the mask material is etched away far more slowly (10 times slower in this example, or could be much slower) than the substrate material. As will be appreciated, the selectivity is relative and depends on the gas or chemicals to be used for the etching process, the substrate material and the mask material. If a different material is used for substrate or if a different gas or chemicals is used for etching, the selectivity of the mask material also may be different.

Figure 4:
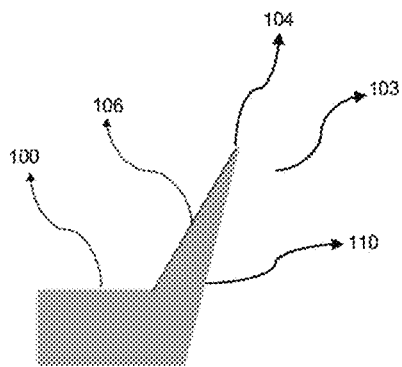
FIG. 4 is a diagram that illustrates a side view of a AFM tip structure at the edge shown in the photographs of FIG. 2.

To cover at least one sidewall [106] of the AFM tip structure [102], a hard material or hard materials is/are evaporated at an angle of (45°-75° or 105°-135°) from the horizontal plane to cover at least one sidewall [108], or could be more than one sidewall, and the apex of the tip structure [104], the adjacent sidewalls will remain exposed [106]. The tip structure is then etched by dry etching process described in this method, with the hard material covering at least one or more than one sidewall(s) [108] of the tip structure [102] as a mask, the exposed areas are then etched away, thus forming a shaft [110] extending downward from the apex [104] of the tip structure [102] and terminating at the bottom of the cantilever [100] to form an AFM probe tip at the edge of the cantilever [103], the shaft [110] having a cross-sectional shape is defined by the shape of the hard mask material [108] on the sidewall or sidewalls, and the etched profile of the ion bombardment or RIE etching process, as can be seen in the photographs shown in FIG. 2 and the illustration in FIG. 4. The hard material mask [108] may be removed in the final step in FIG. 5D by either dry etching or wet etching processes. These processes are further described with more details below.

Deposition:

Any suitable method of forming a hard mask on top surfaces of the AFM probe tip structure [102] may be employed. the approach is described in detail herein. The method can also be applied in a batch process, namely, applying the process to AFM probes individually or on a wafer with plurality of AFM probes at the same time, thus forming the hard masks in a batch, rather than one by one on each of the AFM probe tips. According to the method of forming hard mask, a protective layer of hard mask material is first deposited at an angle over AFM probe tip(s) [108] simultaneously or in a batch manner. The protective, hard mask material can be metal, such as chromium (Cr), titanium (Ti), nickel (Ni), copper (Cu) or aluminum (Al), or non-metal, such as silicon dioxide ($SiO_2$).

Figure 5A:
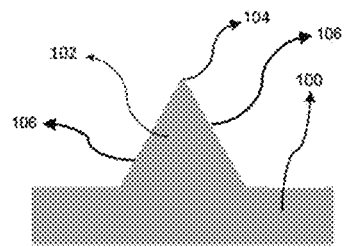
FIGS. 5A, 5B, 5C and 5D are the side view diagrams illustrating steps for fabricating a AFM tip structure at the edge of the cantilever in accordance with the fabrication method of the present invention.
Figure 5B:
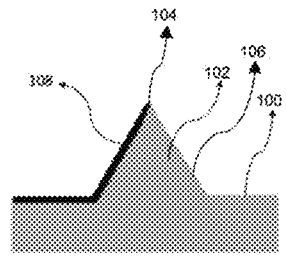

In this example, a layer of Al with thickness ranging from (180 nm-280 nm) is first evaporation coated onto the sidewall [108] of the AFM tip structure [102] (FIG. 5B). The coating may or may not be directional, depending on the coating method used the hard mask material could be coated at an angle of (45°-75° or 105°-135°) from the horizontal plane to cover at least one sidewall (108) but could be more than one sidewall and the apex of the tip structure [104]. In general, at least one sidewall [108] of the AFM tip structure [102] and the flat surfaces adjacent to the sidewall of the AFM tip structure tend to be covered with a hard mask layer (FIG. 5B), however depending on the shape of the AFM tip structure more than one sidewall can be covered by the hard material.

Etching: (Silicon)

Figure 5C:
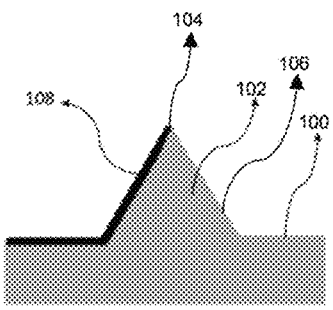

After hard mask(s), are suitably formed on the sidewall [108] of the AFM tip structure, the exposed sidewalls are etched individually or in a batch process, instead of one by one, to form the AFM probe tips (103) or the shaft 110 (FIG. 5C) at the edge of the cantilever. Any one of various etching methods can be used. For a silicon substrate, including silicon wafers with silicon oxide on each silicon apex as masks, plasma produced from a fluorine-based gas, such as SF6/C4F8 plasma, among others, is often a popular choice for etching silicon. Silicon can also be etched using cryogenic etch (cool substrate to below −100° C.) using SF6/O2 gas. Alternatively, Si can be etched using chlorine-based or bromine-based gas, such as Cl2, BCl3, or Br2. Silicon can be etched readily by plasma etching, for example, in a (regular capacitively coupled plasma) reactive ion etching ("RIE") system. Inductively coupled plasma ("ICP") may be used. Thus, one may also use an ICP-RIE method to etch the silicon anisotropically to form almost vertical sidewalls. The result is an AFM tip structure or a shaft protected by the Al mask on at least one side, and on the opposite side having along its length a transverse cross-sectional shape substantially defined by that of the Al mask and the direction of the etching process. In one example, the exposed sidewalls of the AFM probe structure are etched in an RIE system for 20 min with C4F8 (38 seem) and SF6 (22 seem) gases at 10 mT, and 20 W ME power, and temperature of 15° C. to create the AFM tip structure at the edge of the cantilever. This provides an etching rate of about 400 nm/min. At this etching rate and etching time, AFM tip structures with the tip radius of 10-15 nm and tip height of 10-12 μm from the top of the apex of the AFM tip structure (104) to the bottom of the cantilever (100) are formed at the edge of the cantilever (103). Thus, an AFM tip structure, formed unitarily and integrally with the silicon substrate (cantilever). As will be appreciated, the height of the shaft or the tip is selectable through controlling etching rate and etching time. Thus, the aspect ratio of the shaft is also selectable by controlling etching rate and etching time.

Here, "seem" stands for standard cubic centimeter per minute and "mT" means milli-torr.

For RIE, the selection of the added reactive gas is that it should be able to etch the mask material. For example, one may use Cl2 or BCl3 for etching Al, and use Cl2/O2 for etching Cr. ICP power may also be added to RF power (in an ICP-RIE process) to increase the etching rate.

FIG. 2 shows examples of SEM micrographs of the AFM tip structure at the edge of a cantilever fabricated using this process. In one example, one starts from a pre-existing AFM probe with a pyramid, conical or polyhedron base, for example, 380-400 pyramids to form an array of 380-400 such AFM tip structures, i.e., with a density of at least about 380 pillars per 78 cm2 (about π×52 cm2), or at least about 480 pillars per 100 cm2.

Figure 5D:
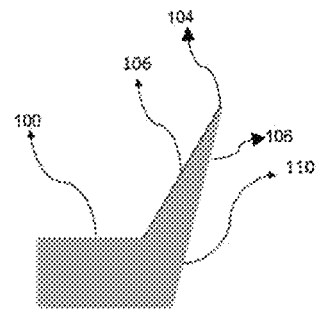
Figure 6A:
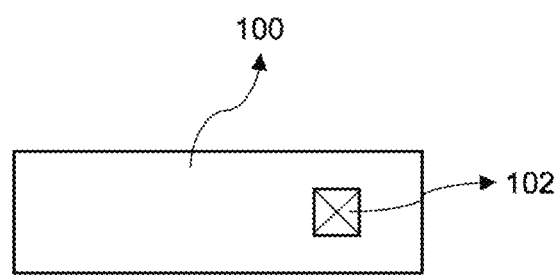
FIGS. 6A, 6B are the top view diagrams illustrating the position of the AFM tip structure on the cantilever or the substrate.
Figure 6B:
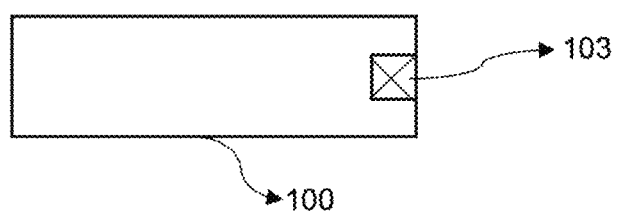

Shaft (110) of the AFM tip structure may be tapered towards the tip of the etched structure, i.e., the apex area, as illustrated in FIG. 5D.

Etching: (Hard Mask Material)

After the silicon etching step, the mask material on the sidewall(s) (108) and the substrate (109) may be removed. The mask material depending on the material used can be removed in a wet etch process, in this example, a mixture of HF acid (2%) is used for 2 minutes to remove the Al mask from the substrate and sidewall(s).

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A method of manufacturing Atomic Force Microscope (AFM) probe tips comprising steps of:
    forming a protective layer by means of depositing a hard material at an angle over a pre-existing AFM probe or a fabricated AFM probe;
    covering at least one side of a tip of the AFM probe with the hard material;
    removing exposed areas, from an apex of the tip of the AFM probe all the way down to a bottom of a substrate by means of employing etching gas with a high selectivity between material of a mask and material of the substrate; and
    forming the tip of the AFM probe at an edge of the substrate and forming a cantilever by means of removing the protective hard material, from the substrate by means of employing the etching acid with a high selectivity between material of a mask and material of the substrate.

2. The method of claim 1, wherein the tip of the AFM probe has one of a variety of shapes and structures with a sharp apex, located anywhere on the surface of the cantilever or at the edge of the cantilever.

3. The method of claim 1, wherein the tip of the AFM probe has a polyhedron, pyramid, or circular base, or any other shape or structure with a single or plurality of sidewalls and with a sharp apex.

4. The method of claim 1, wherein for said deposition, the depositing angle is in the range of 45°-75° or 105°-135° from the horizontal plane.

5. The method of claim 1, wherein said hard material is one of chromium, titanium, nickel, copper, aluminum, or non-metal.

6. The method of claim 5, wherein the non-metal comprises silicon dioxide.

7. The method of claim 1, wherein said hard material is deposited at a said angle on at least a single facet or sidewall, or more, of the said tip of the AFM probe.

8. The method of claim 1, wherein the deposition step is followed by removing non-covered areas by said hard material, from the apex of the AFM tip all the way to the bottom of the cantilever, forming the AFM tip at the edge of the cantilever.

9. The method of claim 1, wherein said removing the exposed silicon area uses the etching gases of: SF6/O2 gases or chlorine-based or bromine-based gas, or Cl2, BCl3, or Br2.

10. The method of claim 1, wherein said removing said hard material from the surface of the tip of the AFM probe and unexposed areas with the etching acid.

11. The method of claim 1, wherein the tip of the AFM probe forms at the edge of the cantilever.

12. The method of claim 1, wherein the AFM tip has at least one or more sides with a steep slope and one or more sides defined by the area covered under said hard material.

13. The method of claim 1, wherein said forming the protective layer, said covering at least one side of the tip of the AFM probe, said removing the exposed areas, and said forming the tip of the AFM probe are applied to plurality of the AFM tips, in a batch manner to process the plurality of the AFM tips.

\* \* \* \* \*